(12) United States Patent
Young (10) Patent No.: US 8,724,131 B2
(45) Date of Patent: May 13, 2014

(54) METHOD, APPARATUS AND COMPUTER-READABLE STORAGE MEDIUM FOR USE IN INKJET PRINTING

(75) Inventor: Chihsin Steven Young, Irvine, CA (US)

(73) Assignee: Canon Kabushiki Kaisha, Tokyo (JP)

( * ) Notice: Subject to any disclaimer, the term of this patent is extended or adjusted under 35 U.S.C. 154(b) by 1165 days.

(21) Appl. No.: 12/398,079

(22) Filed: Mar. 4, 2009

(65) Prior Publication Data

US 2010/0225936 A1    Sep. 9, 2010

(51) Int. Cl.
    *G06K 15/00*    (2006.01)
(52) U.S. Cl.
    USPC ........................................ 358/1.14; 358/1.15
(58) Field of Classification Search
    None
    See application file for complete search history.

(56) References Cited

U.S. PATENT DOCUMENTS

| | | | |
|---|---|---|---|
| 5,272,518 A | 12/1993 | Vincent | |
| 5,576,744 A | 11/1996 | Niikura et al. | |
| 6,325,505 B1 | 12/2001 | Walker | |
| 6,435,642 B1 * | 8/2002 | Jackson et al. | 347/19 |
| 6,548,813 B1 | 4/2003 | Fujikawa et al. | |
| 6,752,483 B1 | 6/2004 | Vega et al. | |
| 6,764,158 B2 | 7/2004 | Arquilevich et al. | |
| 6,812,997 B2 | 11/2004 | Kaltenbach et al. | |
| 6,832,824 B1 | 12/2004 | Baker et al. | |
| 6,874,864 B1 * | 4/2005 | Maeda et al. | 347/41 |
| 6,994,432 B2 | 2/2006 | Scofield et al. | |
| 7,156,482 B2 | 1/2007 | Boleda et al. | |
| 7,156,483 B2 | 1/2007 | King et al. | |
| 7,192,115 B2 | 3/2007 | Kojima | |
| 7,274,886 B2 | 9/2007 | Suzuki | |
| 7,322,665 B2 | 1/2008 | Shibata et al. | |
| 7,325,898 B2 | 2/2008 | Kawazoe et al. | |
| 7,384,123 B2 | 6/2008 | Kawatoko et al. | |
| 7,396,098 B2 | 7/2008 | Kanematsu et al. | |
| 7,399,046 B2 | 7/2008 | Teshigawara et al. | |
| 2002/0024544 A1 * | 2/2002 | Codos | 347/8 |
| 2003/0053104 A1 | 3/2003 | Morisaki et al. | |
| 2004/0239744 A1 | 12/2004 | Otsuki | |
| 2005/0127597 A1 | 6/2005 | Sano et al. | |
| 2006/0158472 A1 | 7/2006 | Endo | |
| 2006/0203028 A1 | 9/2006 | Agarwal et al. | |

\* cited by examiner

*Primary Examiner* — Saeid Ebrahimi Dehkordy
*Assistant Examiner* — Lennin Rodriguezgonzale
(74) *Attorney, Agent, or Firm* — Canon U.S.A., Inc. IP Division (57) ABSTRACT

Method, apparatus and computer-readable storage medium for use in performing a pre-print scan of a recording medium using a first sensor, wherein pre-print data is obtained from the pre-print scan, the pre-print data corresponding to an area of the recording medium upon which printing is to be performed; performing a post-print scan of the recording medium using a second sensor, wherein post-print data is obtained from the post-print scan, the post-print data corresponding to the area after printing was to have been performed thereon; and determining whether printing was successful using the pre-print data and the post-print data.

20 Claims, 6 Drawing Sheets

METHOD, APPARATUS AND COMPUTER-READABLE STORAGE MEDIUM FOR USE IN INKJET PRINTING

BACKGROUND OF THE INVENTION

1. Field of the Invention

The present invention relates to a method, apparatus and computer-readable storage medium for use in determining whether printing was successful.

2. Description of the Related Art

Printers are well known, including printers that utilize sensors for various functions. In some instances, printing does not occur despite the execution of a print command due to an error, interference with the print processing or some other reason.

SUMMARY OF THE INVENTION

Embodiments of the present invention are directed to performing a pre-print scan and a post-print scan of a recording medium and determining whether printing was successful using pre-print data and post-print data.

Some embodiments of the present invention provide a method for use in printing. The method includes performing a pre-print scan of a recording medium using a first sensor; performing a post-print scan of the recording medium using a second sensor; and determining whether printing was successful using pre-print data and post-print data. The pre-print data is obtained from the pre-print scan. The pre-print data corresponds to an area of the recording medium upon which printing is to be performed. The post-print data is obtained from the post-print scan. The post-print data corresponds to the area after printing was to have been performed thereon.

Some embodiments of the present invention provide an apparatus for use in printing. The apparatus includes a first sensor that performs a pre-print scan of a recording medium; a second sensor that performs a post-print scan of the recording medium; and a controller that determines whether printing was successful using pre-print data and post-print data. The pre-print data is obtained from the pre-print scan. The pre-print data corresponds to an area of the recording medium upon which printing is to be performed. The post-print data is obtained from the post-print scan. The post-print data corresponds to the area after printing was to have been performed thereon.

Some embodiments of the present invention provide a computer-readable storage medium storing computer-executable instructions for causing a computer to execute a method. The method includes performing a pre-print scan of a recording medium using a first sensor; performing a post-print scan of the recording medium using a second sensor; and determining whether printing was successful using pre-print data and post-print data. The pre-print data is obtained from the pre-print scan. The pre-print data corresponds to an area of the recording medium upon which printing is to be performed. The post-print data is obtained from the post-print scan. The post-print data corresponds to the area after printing was to have been performed thereon.

Further features of the present invention will become apparent from the following description of exemplary embodiments with reference to the attached drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

DESCRIPTION OF THE EMBODIMENTS

Embodiments of the present invention are described with reference to the drawings.

Figure 1:
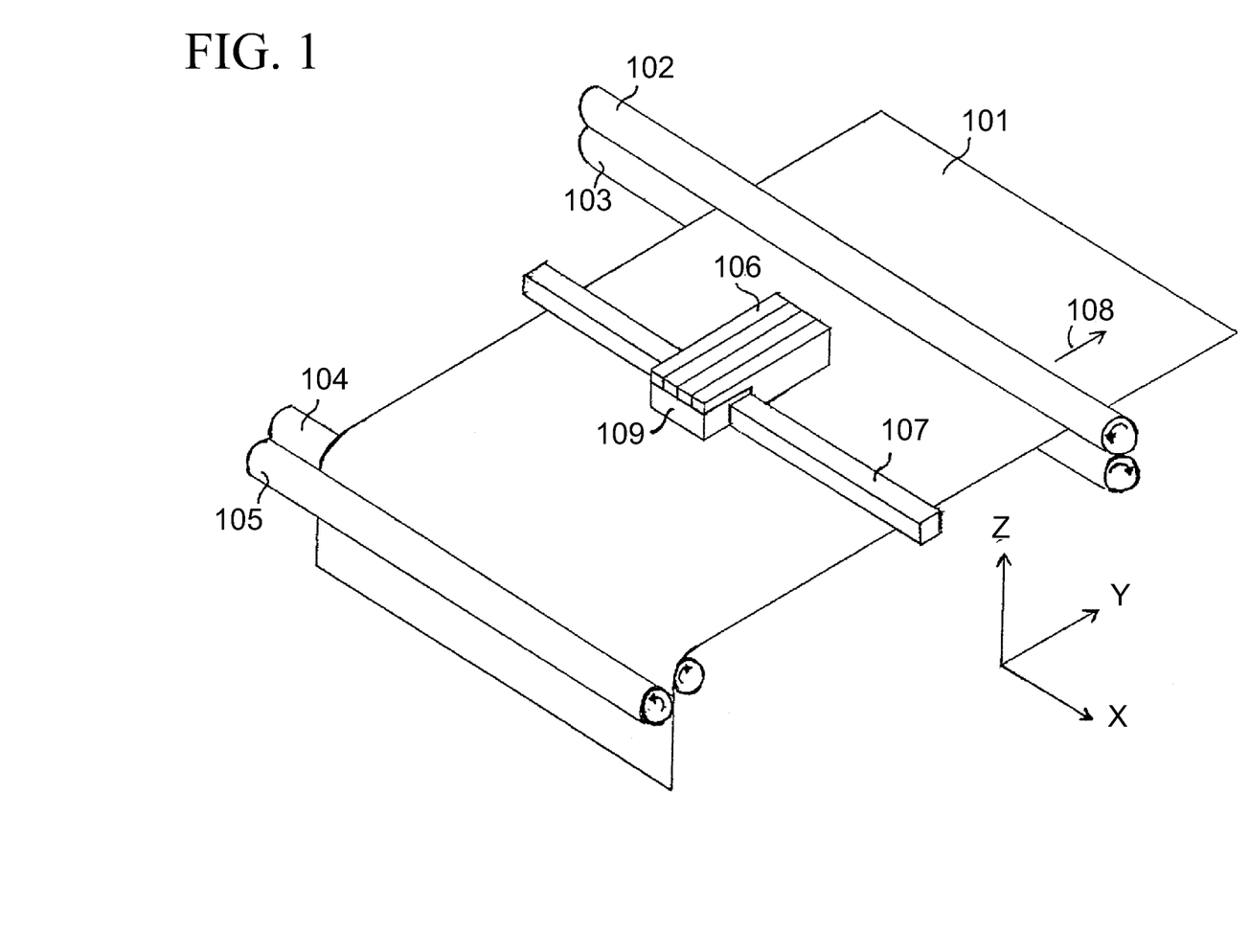
FIG. 1 is a perspective view that illustrates the essence of a printing apparatus according to some embodiments of the present invention.

FIG. 1 is a perspective view that illustrates the essence of a printing apparatus according to some embodiments of the present invention. For clarity, portions of the printing apparatus have not been illustrated. FIG. 1 illustrates a recording medium 101, a first roller 102, a second roller 103, a third roller 104, a fourth roller 105, ink cartridges 106, a rod 107, a carriage 109, and an arrow 108 that indicates the recording medium 101 is fed out of the printing apparatus in a Y direction.

Figure 3:
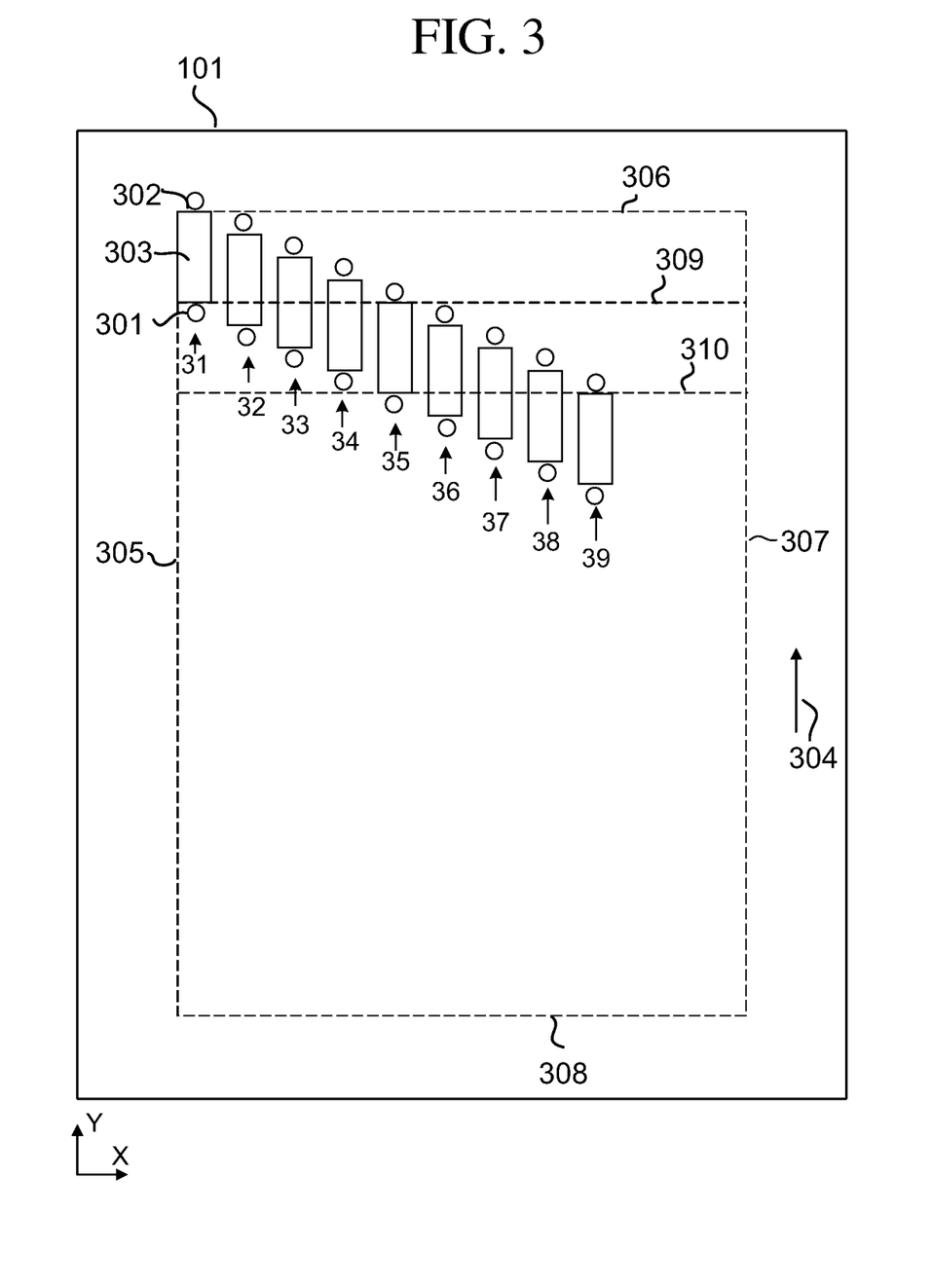
FIG. 3 illustrates operations of a printing apparatus according to some embodiments of the present invention.
Figure 5:
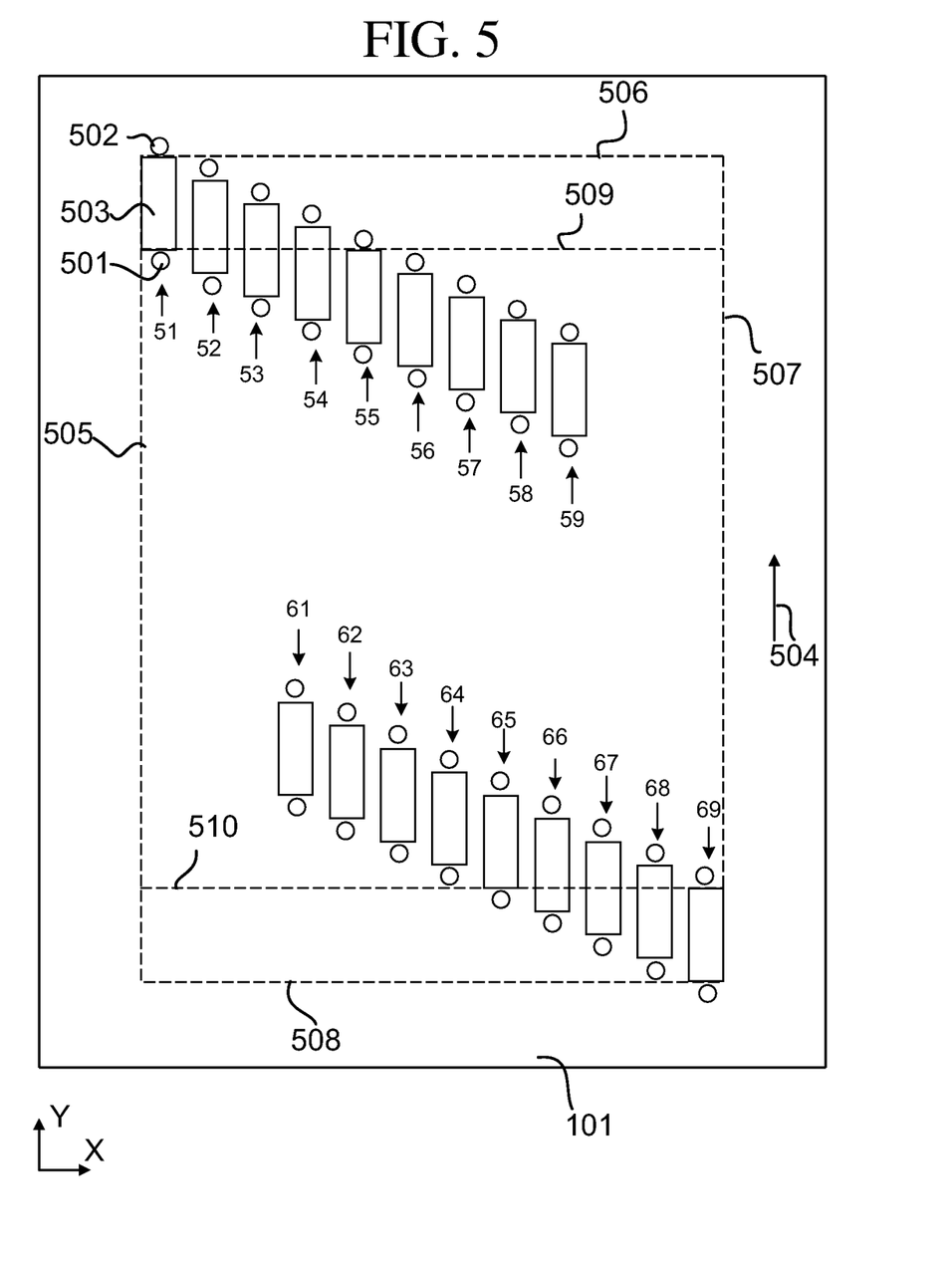
FIG. 5 illustrates operations of a printing apparatus according to some embodiments of the present invention.

Throughout the specification, the term "X direction" refers to the direction of the positive X-axis (i.e., the direction the X-axis arrow is pointing) of the XYZ coordinate system shown in FIG. 1 or the XY coordinate system shown in FIG. 3 and FIG. 5. Similarly, the term "Y direction" refers to the direction of the positive Y axis of the XYZ coordinate system shown in FIG. 1 or the XY coordinate system shown in FIG. 3 and FIG. 5. The terms "negative X direction" and "negative Y direction" refer to the directions opposite the X direction and the Y direction, respectively.

The recording medium 101 is fed through the printing apparatus by virtue of the first, second, third and fourth rollers 102 to 105. The first roller 102 and the second roller 103 are adjacent to each other such that the recording medium 101 is situated between and is in contact with both the first roller 102 and the second roller 103 as the recording medium 101 is fed through the printing apparatus. The first roller 102 rotates in a counter-clockwise direction while the second roller 103 rotates in a clockwise direction in order to advance the recording medium 101. Likewise, the third roller 104 and the fourth roller 105 are adjacent to each other such that the recording medium 101 is situated between and is in contact with both the third roller 104 and the fourth roller 105 as the recording medium 101 is fed through the printing apparatus. The third roller 104 rotates in a clockwise direction while the fourth roller 105 rotates in a counter-clockwise direction in order to advance the recording medium 101. The arrow 108 indicates the direction that the recording medium 101 advances relative to the ink cartridges 106 when the rollers 102 to 105 rotate, namely the Y direction.

The carriage 109 supports the ink cartridges 106 and moves in an X direction along the rod 107 during a printing pass. The ink cartridges 106 may comprise one or more cartridges, each cartridge containing one or more colors of ink. A print head (not shown in FIG. 1) is coupled to the ink cartridges 106 at the side of the ink cartridges 106 facing a surface of the recording medium 101. That is, the print head is situated between the ink cartridges 106 and the surface of the recording medium 101; and a surface of the print head faces the surface of the recording medium 101. A print head is further described with reference to FIGS. 3 to 6. The print head includes nozzles (not shown) facing the surface of the recording medium 101. The nozzles are situated in one or more rows and are aligned in the Y direction, according to some embodiments. During a printing pass, the nozzles contained on the print head are moved in the X direction by virtue of the movement of the carriage 109, such that the ink can be dispensed across the width (in the X direction) of the recording medium 101.

When the printing apparatus receives a print command, the print head performs a printing pass by moving in the X direction from a start position over the recording medium 101 to an end position. During the printing pass, the print head dispenses ink according to the print command. The ink dispensed onto the recording medium 101 during the printing pass comprises a print band. During the printing pass, the rollers 102 to 105 do not rotate. After the printing pass, the rollers 102 to 105 rotate as described herein to advance the recording medium 101 in the Y direction. The print head thereafter performs another printing pass, dispensing ink as the print head passes over the recording medium 101 in the negative X direction. The rollers 102 to 105 subsequently rotate to advance the recording medium 101 still further. The print head and rollers 102 to 105 continue to alternate in this manner so as to dispense ink onto the recording medium 101 in an incremental fashion and according to the print command.

The foregoing description regarding the execution of a print command is an example of one such process. In some embodiments of the present invention, one or more of the following processes for executing a print command are utilized: a variety of combinations of simultaneous movement of the print head and the rollers 102 to 105; multiple printing passes of the print head without movement of the rollers 102 to 105; dispensing of ink by only a portion of the ink cartridges 106 and/or by only a portion of the nozzles during a particular printing pass; movement of the print head back and forth in the X direction and negative X direction during a single printing pass; movement of the recording medium 101 back and forth in the Y direction and negative Y direction during or between printing passes by virtue of alternative rotations of the rollers 102 to 105; and other like variations of executing a print command.

Furthermore, according to some embodiments of the present invention, the printing apparatus includes any apparatus that can execute a print command by virtue of one or more printing passes of a print head, including apparatuses where a recording medium is not advanced by rollers. Still further, according to some embodiments of the present invention, the print head is coupled to the carriage 109; the print head supports the ink cartridges 106; and/or the print head itself is a device that includes one or more ink cartridges. Further by way of example, according to some embodiments of the present invention, the ink cartridges 106 themselves include a print head.

Figure 2:
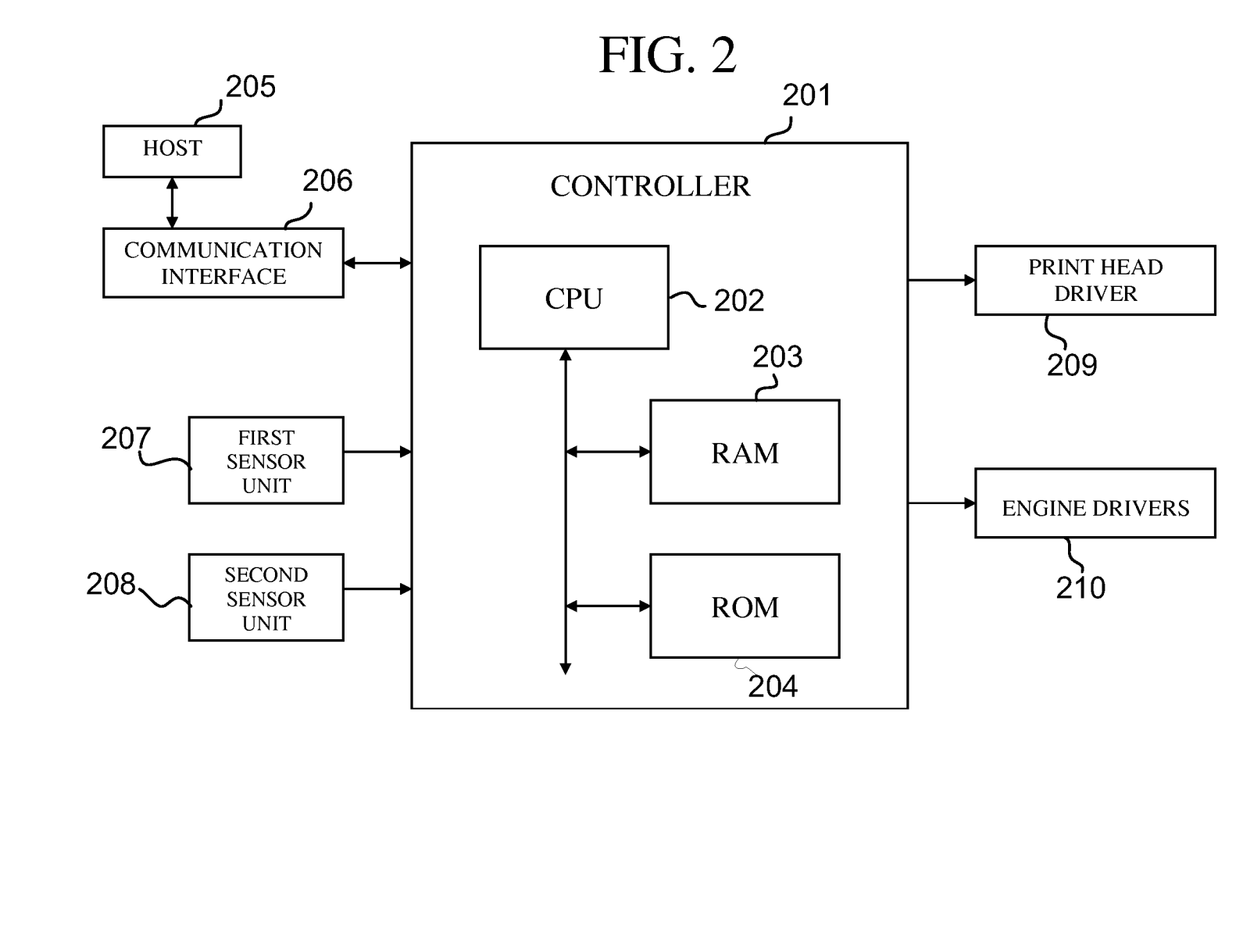
FIG. 2 is a block diagram that illustrates a configuration of a control structure of a printing apparatus according to some embodiments of the present invention.

FIG. 2 is a block diagram that illustrates a configuration of a control structure of a printing apparatus according to some embodiments of the present invention. FIG. 2 illustrates a controller 201, a central processing unit (CPU) 202, random access memory (RAM) 203, read-only memory (ROM) 204, a host 205, a communication interface 206, a first sensor unit 207, a second sensor unit 208, a print head driver 209, and engine drivers 210.

The controller 201 is a main control unit for the printing apparatus and is configured to execute operations and processes of the printing apparatus that are described herein, according to various embodiments. The controller 201 includes the CPU 202, the RAM 203, and the ROM 204, which are mutually connected for the transmission of data and control signals. In some embodiments, the controller 201 and the communication interface 206 send and receive data and control signals to and from each other, the controller 201 receiving data input from a source external to the printing apparatus, such as the host 205, via the communication interface 206. The controller 201 executes a print command by supplying data and control signals to the print head driver 209 and the engine drivers 210.

The CPU 202 executes various processes and controls the printing apparatus in accordance with various programs stored in memory. The CPU 202 controls reading data and control signals into or out of memory. The CPU 202 uses the RAM 203 as a work area and executes programs stored in the ROM 204.

The RAM 203 is used as a work area when various programs stored in the ROM 204 are executed, a temporary save area for various data, and a work area during execution of various processes.

The ROM 204 stores data and programs having computer-executable instructions for execution by the CPU 202. The ROM 204 stores programs configured to cause the printing apparatus to execute operations and processes described herein, according to various embodiments. Data stored in the ROM 204 includes data corresponding to an image to be printed by the printing apparatus as well as other data.

The host 205 is an image supply source including a computer that processes image data and data related to printing. The host 205 includes a printer driver for entering or setting up data related to the printing. Data and/or signals may be sent between the host 205 and the controller 201 via the communication interface 206.

The first sensor unit 207 includes a sensor. The first sensor unit 207 is configured to detect and measure a physical quantity and convert the measurement into data or a signal. In some embodiments, the first sensor unit 207 performs calculations using data corresponding to the measurements. In some embodiments, the first sensor unit 207 includes memory for the storage of data corresponding to measurements, and also for the storage of programs for the execution of the various processes of the first sensor unit 207. According to some embodiments, the first sensor unit 207 utilizes the controller 201 to execute various operations, processes and/or programs of the first sensor unit 207. The first sensor unit 207 sends data to the controller 201.

The second sensor unit 208 includes a sensor. The second sensor unit 208 is configured to detect and measure a physical quantity and convert the measurement into data or a signal. In some embodiments, the second sensor unit 208 performs calculations using data corresponding to the measurements. In some embodiments, the second sensor unit 208 includes memory for the storage of data corresponding to measurements, and also for the storage of programs for the execution of the various processes of the second sensor unit 208. According to some embodiments, the second sensor unit 208 utilizes the controller 201 to execute various operations, processes and/or programs of the second sensor unit 208. The second sensor unit 208 sends data to the controller 201.

The print head driver 209 drives components of the print head to execute a print command. For example, upon receiving a print command from the controller 201, the print head driver 209 drives an ejection heater in accordance with a drive timing signal in order to eject ink from the print head according to the print command.

The engine drivers 210 drive various components of the printing apparatus to execute a print command. For example, upon receiving a print command from the controller 201, the engine drivers 210 drive motors in the rollers 102 to 105 and/or the carriage 109 so as to move the recording medium 101 and/or the print head, respectively, according to the print command.

In some embodiments, the controller 201 includes a computer-readable storage medium. The computer-readable storage medium can be, for example, a built-in hard disk drive, non-volatile "flash" memory, removable memory, such as a compact disk (CD), digital versatile disk (DVD), a CD-ROM, memory card, magneto-optical disk or any combination thereof. All or a portion of the computer-readable storage medium may be in the form of one or more removable blocks, modules, or chips. The computer-readable storage medium need not be one physical memory device, but can include one or more separate memory devices.

The components illustrated in FIG. 2 and described herein each include one or more circuits, according to some embodiments. As described herein, those skilled in the art will appreciate that circuit(s) can refer to dedicated fixed-purpose circuits and/or partially or wholly programmable platforms of various types and that these teachings are compatible with any such mode of deployment for the components illustrated in FIG. 2. The components of FIG. 2 include any type of executable instructions that can be implemented as, for example, hardware, firmware and/or software, or any combination thereof, which are all within the scope of the various teachings described.

FIG. 3 illustrates operations of a printing apparatus according to some embodiments of the present invention. FIG. 3 illustrates a recording medium 101, a first sensor 301, a second sensor 302, a print head 303, an arrow 304 to indicate a direction of movement of the recording medium 101 in the Y direction, and lines 305 to 310 as references for convenience of description. Also for convenience of description, each of reference numerals 31 to 39 denotes positions of components (301, 302, 303) of the printing apparatus in the Y direction. For clarity, portions of the printing apparatus have not been illustrated.

The first sensor 301 detects and measures a physical quantity and converts the measurement into a signal. In some embodiments, the first sensor 301 includes an optical sensor that measures the optical density of light from the surface of the recording medium 101. The optical density measurements vary depending upon the absence or presence (and extent) of markings and/or ink on the recording medium 101. The first sensor 301 is coupled to and aligned with the print head 303. The first sensor 301 faces the surface of the recording medium 101 such that optical measurement of the surface of the recording medium 101 is facilitated. During a printing pass, the print head 303 moves in the X direction relative to the recording medium 101 and the first sensor 301 scans the recording medium 101 during the printing pass. The first sensor 301 measures the optical density of incremental portions of an area of the surface of the recording medium 101 during the scan. In some embodiments, data corresponding to optical density measurements taken during the scan are used to determine the average print density of the area of the surface of the recording medium 101 measured during the printing pass.

The second sensor 302 detects and measures a physical quantity and converts the measurement into a signal. In some embodiments, the second sensor 302 includes an optical sensor that measures the optical density of light from the surface of the recording medium 101. The optical density measurements vary depending upon the absence or presence (and extent) of markings and/or ink on the recording medium 101. The second sensor 302 is coupled to and aligned with the print head 303. The second sensor 302 faces the surface of the recording medium 101 such that optical measurement of the surface of the recording medium 101 is facilitated. During a printing pass, the print head 303 moves in the X direction relative to the recording medium 101 and the second sensor 302 scans the recording medium 101 during the printing pass. The second sensor 302 measures the optical density of incremental portions of an area of the surface of the recording medium 101 during the scan. In some embodiments, data corresponding to optical density measurements taken during the scan are used to determine the average print density of the area of the surface of the recording medium 101 measured during the printing pass.

The print head 303 includes an ink-dispensing device able to dispense ink from a surface of the print head onto a surface of the recording medium 101. According to some embodiments of the present invention, the print head 303 is coupled to, supports and/or includes the ink cartridges 106 discussed with reference to FIG. 1. The print head 303 includes the nozzles discussed with reference to FIG. 1 that face the recording medium 101, and from which ink is dispensed onto the recording medium 101 when printing is performed.

The recording medium 101 includes a printable area, according to some embodiments of the present invention. The printable area of the recording medium 101 includes the area of the recording medium 101 upon which ink can be dispensed during printing. In some embodiments, the printable area does not include a margin of the recording medium 101. For example, the area circumscribed by line 305, line 306, line 307 and line 308 may comprise the printable area of the recording medium 101, according to some embodiments. In some embodiments, the printable area includes one or more margins of the recording medium 101. In some embodiments, the printable area comprises the entire surface of the recording medium 101.

Some terms used herein for clarity and convenience of description are discussed next. The term "above" refers to the relative position of a first location to a second location when the first location is further in the Y direction than the second location, while the term "below" refers to the relative position of the second location to the first location. For example, the second sensor 302 is above the first sensor 301 (and the first sensor 301 is below the second sensor 302) in FIG. 3 because the second sensor 302 is further in the Y direction than the first sensor 301. Similarly, the terms "right" and "left" refer to the relative positions of locations separated in the X direction, where "right" refers to the relative position of the location further in the X direction and "left" refers to the relative position of the location further in the negative X direction. The foregoing terms are used for clarity and convenience of description and should not limit the present invention.

Still referring to FIG. 3, the relative positioning of components of the printing apparatus is illustrated, according to some embodiments. The first sensor 301 is positioned below the print head 303. The second sensor 302 is positioned above the print head 303 on the opposite side of the print head 303 relative to the first sensor 301. The first sensor 301 and the second sensor 302 are substantially aligned in the Y direction. The print head 303 is coupled to the first sensor 301 and to the second sensor 302, such that the three components form an integrated unit.

FIG. 3 illustrates this integrated unit situated at various positions relative to the recording medium 101. Each of positions 31 to 39 illustrates a position of the print head 303 in the Y direction, a position of the first sensor 301 in the Y direction, and a position of the second sensor 302 in the Y direction. For example, at position 31, the respective positions of these components in the Y direction may be described as follows: the print head 303 is situated between line 306 and line 309; the first sensor 301 is situated adjacent to and below line 309; and the second sensor 302 is situated adjacent to and above line 306.

As illustrated by the positions 31 to 39, the print head 303 moves incrementally in the negative Y direction relative to the recording medium 101 during successive printing passes, according to some embodiments. For each of the positions of the print head 303 in the Y direction illustrated by the positions 31 to 39, the print head 303 performs a printing pass in the X direction or negative X direction across the width of the recording medium 101. Although exemplary X-direction positions of the print head 303 are illustrated in FIG. 3, the positions 31 to 39 do not denote any particular position in the X direction; rather, the positions 31 to 39 denote positions in the Y direction. The various X-direction positions of the print head 303 illustrated in FIG. 3 are examples of the positioning of the print head 303 at different points of advancement by the print head 303 in the X direction or negative X direction during the respective printing passes. Furthermore, the number of positions illustrated in FIG. 3 should not be seen as limiting the present invention as to the number of printing passes performed or in any other way.

By way of example, successive movements of the print head 303 will now be discussed. At position 31, the left side of the print head 303 is initially situated at line 305, as shown in FIG. 3. When operation of the printing apparatus advances, the print head 303 moves in the X direction across the width of the recording medium 101 until the right side of the print head 303 is situated at line 307. This movement of the print head 303 comprises a printing pass ("printing pass at position 31") during which printing is performed. Thus, at the completion of the printing pass at position 31, the right side of the print head 303 is situated at line 307 and the print head 303 is at position 31 in the Y direction.

During the printing pass at position 31, the print head 303 dispenses ink from the nozzles onto the recording medium 101 according to a print command. The dispensed ink comprises a print band. The print band is situated between lines 306 and 309 in the Y direction and between lines 305 and 307 in the X direction. The height (in the Y direction) of the print band corresponds to the positioning and size of the one or more nozzle rows on the print head 303. As printing is performed during the printing pass at position 31, the first sensor 301 coupled to the print head 303 simultaneously performs a pre-print scan of the recording medium 101.

Regarding the area ("pre-print scan area at position 31") scanned by the first sensor 301 during this pre-print scan, the first sensor 301 is at position 31 in the Y direction and moves in the X direction over an area adjacent to and below line 309. The height of the pre-print scan area at position 31 corresponds to the size of the first sensor 301 in the Y direction, while the width corresponds to the distance the first sensor 301 traverses in the X direction during the printing pass at position 31. The pre-print scan area at position 31 is an area upon which printing is to be performed during subsequent printing passes, but upon which printing is not performed during the printing pass at position 31.

During the pre-print scan, the first sensor 301 measures incremental segments of the pre-print scan area at position 31 and thereby obtains the optical density of each incremental segment. Since a pre-print scan is of an area upon which printing is to be performed during subsequent printing passes, the measured optical densities are generally minimal (relative to optical density measurements for an area having a print band, for example). However, significantly larger measurements of optical density than are typical for pre-print scans occur in cases where markings or ink traces are present in the area scanned during a pre-print scan.

Once optical density measurements are obtained for incremental segments of the pre-print scan area at position 31, the data is used to calculate the average print density for the pre-print scan area at position 31. The average print density is determined by averaging the optical densities of the incremental segments of the pre-print scan area at position 31. The average print density for the pre-print scan area at position 31 is then saved by storing data corresponding to the average print density for the pre-print scan area at position 31 in the memory of the printing apparatus.

To summarize, during the printing pass at position 31, the print head 303 dispenses a print band in the area bounded by lines 306 and 309 in the Y direction and by lines 305 and 307 in the X direction. Simultaneously, the first sensor 301 performs a pre-print scan of the pre-print scan area at position 31, which is an area adjacent to and below line 309 and over which the first sensor 301 passes during the printing pass at position 31.

After the printing pass at position 31, the recording medium 101 advances in the Y direction as indicated by arrow 304. By way of example, movement of the recording medium 101 may be accomplished by rollers in the manner described with respect to FIG. 1. The print head 303, the first sensor 301 and the second sensor 302 remain stationary while the recording medium 101 advances in the Y direction. This movement brings about the relative positioning of the recording medium 101 and the print head 303, the first sensor 301 and the second sensor 302 illustrated by position 32. Regarding the X direction, the right side of the print head 303 is initially situated at line 307 when the print head 303 is brought into position 32.

When operation of the printing apparatus advances, the print head 303 moves in the negative X direction across the width of the recording medium 101 until the left side of the print head 303 is situated at line 305. This comprises a printing pass at position 32. Thus, at the completion of the printing pass at position 32, the left side of the print head 303 is situated at line 305 and the print head 303 is at position 32 in the Y direction.

Thereafter, the printing apparatus performs subsequent printing passes in the manner described so as to execute the print command. For example, a printing pass at position 33 is subsequently performed in the X direction, and then a printing pass at position 34 is performed in the negative X direction, and so on. By way of example, the printing pass at position 36 will now be discussed to illustrate some embodiments of the present invention.

During the printing pass at position 36, a print band is dispensed in a similar manner as described with respect to the printing pass at position 31. The position in the Y direction of the print band dispensed during the printing pass at position 36 corresponds to the position of the print head 303 at position 36. Regarding the X direction, this print band is situated between lines 305 and 307. As printing is performed during the printing pass at position 36, the first sensor 301 coupled to the print head 303 simultaneously performs a pre-print scan of the recording medium 101.

Regarding the area (pre-print scan area at position 36) scanned during this pre-print scan, the first sensor 301 is at position 36 in the Y direction and moves in the negative X direction. The height of the pre-print scan area at position 36 corresponds to the size of the first sensor 301 in the Y direction, while the width corresponds to the distance the first sensor 301 traverses in the negative X direction during the printing pass at position 36.

The first sensor 301 performs the pre-print scan of the pre-print scan area at position 36 in the same manner as the first sensor 301 performed the pre-print scan of the pre-print scan area at position 31. Thus, the description regarding the pre-print scan during the printing pass at position 31 applies to the pre-print scan during the printing pass at position 36.

During the printing pass at position 36, the second sensor 302 performs a post-print scan. Thus, the following operations occur simultaneously during the printing pass at position 36: the print head 303 dispenses a print band, the first sensor 301 performs a pre-print scan of the pre-print scan area at position 36, and second sensor 302 performs a post-print scan.

Regarding the area ("post-print scan area at position 36") scanned by the second sensor 302 during this post-print scan, the second sensor 302 is at position 36 in the Y direction and moves in the negative X direction over the area adjacent to and below line 309. The height of the post-print scan area at position 36 corresponds to the size of the second sensor 302 in the Y direction, while the width corresponds to the distance the second sensor 302 traverses in the negative X direction during the printing pass at position 36. The post-print scan area at position 36 is an area upon which printing was to have been performed during previous printing passes, but upon which printing is not performed during the printing pass at position 36.

During the post-print scan, the second sensor 302 measures incremental segments of the post-print scan area at position 36 and thereby obtains the optical density of each incremental segment. Since a post-print scan is of an area upon which printing was to have been performed during previous printing passes, the measured optical densities are generally substantially higher than, for example, optical density measurements for an area not having a print band.

Once optical density measurements are obtained for incremental segments of the post-print scan area at position 36, the data is used to calculate the average print density for the post-print scan area at position 36. The average print density is determined by averaging the optical densities of the incremental segments of the post-print scan area at position 36. In some embodiments, the average print density for the post-print scan area at position 36 is then saved by storing data corresponding to the average print density for the post-print scan area at position 36 in the memory of the printing apparatus.

As illustrated in FIG. 3, the pre-print scan area at position 31 and the post-print scan area at position 36 overlap each other. That is, the area scanned by the first sensor 301 during the printing pass at position 31 and the area scanned by the second sensor 302 during the printing pass at position 36 overlap each other. By virtue of these scans, the average print density of the area adjacent to and below line 309 is obtained before printing was to have been performed thereon and, subsequently, the average print density of the area adjacent to and below line 309 is obtained after printing was to have been performed thereon.

The average print density of the pre-print scan area at position 31 is compared with the average print density of the post-print scan area at position 36. As further discussed with reference to FIG. 4, if the difference between the compared average print densities is at least a predetermined level, then it is determined that printing was successful at the area adjacent to and below line 309.

According to some embodiments of the present invention, the first sensor 301 and/or the second sensor 302 perform a scan during each printing pass. According to some embodiments, the first sensor 301 and/or the second sensor 302 perform a scan during some of the printing passes. Furthermore, while the pre-print scan and the post-print scan have been discussed with reference to specific printing passes, the pre-print scan and the post-print scan are also performed during other printing passes.

For example, the first sensor 301 performs a pre-print scan of an area adjacent to and above line 310 during the printing pass at position 34, and the second sensor 302 subsequently performs a post-print scan of the area adjacent to and above line 310 during the printing pass at position 39. The average print densities measured during these scans are then compared to determine whether printing was successful at the area adjacent to and above line 310. Similarly, data from pre-print scans during the printing passes at position 32 and 33 are compared with data from post-print scans during the printing passes at position 37 and 38, respectively.

FIG. 3 illustrates four-pass printing. After each printing pass, the print head 303 moves relative to the recording medium 101 in the negative Y direction by a distance substantially equal to a quarter of the height of the print head 303. Thus, a portion of the print head 303 passes over an area of the recording medium 101 during each of four successive printing passes in some embodiments. This relative movement of the various components of the printing apparatus determines which post-print scan area overlaps with a given pre-print scan area; and, hence, which data are compared to determine successful printing at a given area of the recording medium 101. Four-pass printing is utilized in some embodiments of the present invention.

Although specific examples are described herein, the scope of the claims should not be limited thereto. For example, alternative processes to four-pass printing (e.g., three-pass printing) are utilized in some embodiments. Furthermore, sensors other than optical sensors are utilized in some embodiments of the present invention, a thermal sensor being one such example. Furthermore, alternative arrangements of one or more components of the printing apparatus are utilized in some embodiments of the present invention. For example, in some embodiments, the sensors are not positioned on a center line (in the Y direction) of the print head, but may be positioned to one side or the other of the center line. In some embodiments, an edge of respective sensors is positioned so as to be aligned with an edge of the print head. In some embodiments, a different number of sensors than shown in the figures is/are utilized.

Figure 4:
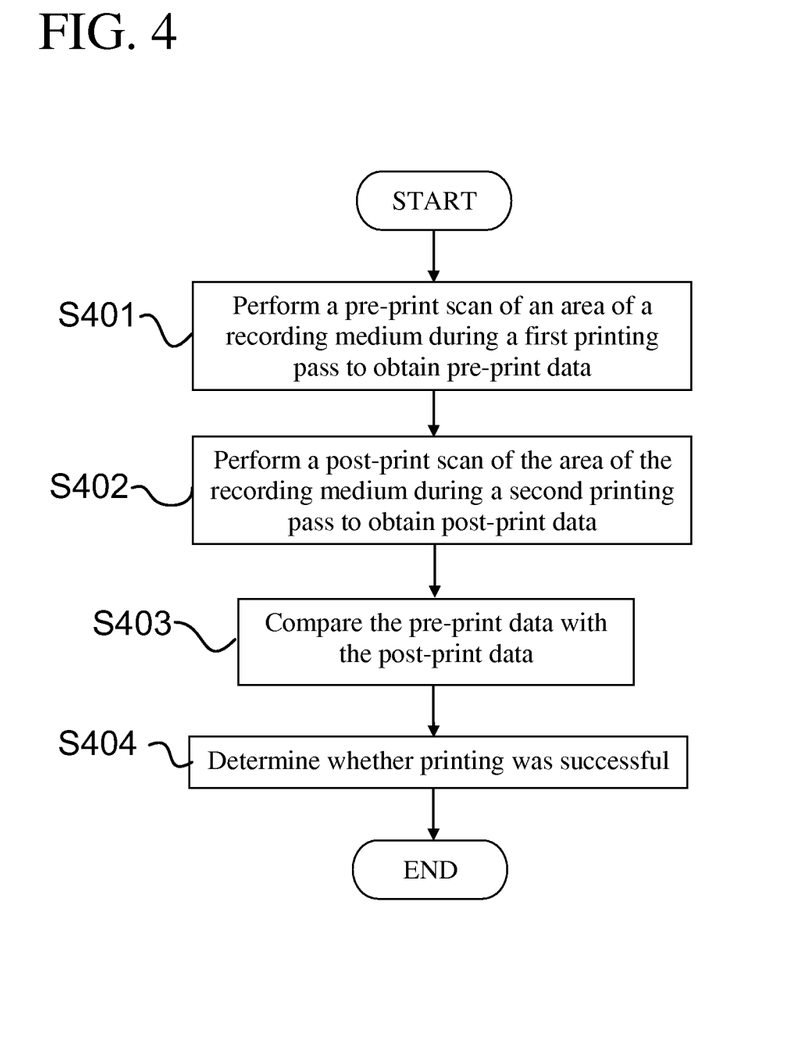
FIG. 4 is a flow diagram that illustrates operations of a printing apparatus according to some embodiments of the present invention.

FIG. 4 is a flow diagram that illustrates operations of a printing apparatus according to some embodiments of the present invention.

At step S401, the printing apparatus performs a pre-print scan of an area of a recording medium during a first printing pass to obtain pre-print data. For example, the first sensor 301 performs a pre-print scan during the printing pass at position 31 such that the average print density of the pre-print scan area at position 31 can be determined. In some embodiments, the pre-print data is saved in the memory of the printing apparatus.

At step S402, the printing apparatus performs a post-print scan of the area of the recording medium during a second printing pass to obtain post-print data. For example, the second sensor 302 performs a post-print scan during the printing pass at position 36 such that the average print density of the post-print scan area at position 36 can be determined. The pre-print scan area at position 31 and the post-print scan area at position 36 overlap each other. In some embodiments, the post-print data is saved in the memory of the printing apparatus.

At step S403, the printing apparatus compares the pre-print data with the post-print data. For example, the controller 201 compares the average print density of the pre-print scan area at position 31 with the average print density of the post-print scan area at position 36. Comparing the pre-print data with the post-print data includes determining a difference between the pre-print data and the post-print data.

At step S404, the printing apparatus determines whether printing was successful. For example, the controller 201 determines whether printing was successful at the area adjacent to and below line 309 where the pre-print scan area at position 31 and the post-print scan area at position 36 overlap. By way of example, the controller 201 determines that printing was successful when the difference between the average print density of the pre-print scan area at position 31 and the average print density of the post-print scan area at position 36 is at least a predetermined level.

The predetermined level is a tolerance level indicating something has been printed, according to some embodiments of the present invention. That is, the predetermined level is a level of average print density such that if an area that was expected to have been printed upon was determined to have an average print density difference that was equal to or less than that level, then it would be probable that some error, abnormality or interference occurred during execution of the printing. For example, one or more print bands may not have printed.

In the above example, the average print density of the pre-print scan area at position 31 is stored. The average print density of the post-print scan area at position 36 is subsequently obtained. When the stored average print density of the pre-print scan area at position 31 is subtracted from the average print density of the post-print scan area at position 36, if the resulting value is above the predetermined level, then printing at that area was likely successful. On the other hand, if the resulting value is equal to or less than the predetermined value, then printing at that area was likely unsuccessful.

FIG. 5 illustrates operations of a printing apparatus according to some embodiments of the present invention. FIG. 5 illustrates a recording medium 101, a first sensor 501, a second sensor 502, a print head 503, an arrow 504 to indicate a direction of movement of the recording medium 101 in the Y direction, and lines 505 to 510 as references for convenience of description. Also for convenience of description, each of reference numerals 51 to 59 and 61 to 69 denotes positions of components (501, 502, 503) of the printing apparatus in the Y direction. For clarity, portions of the printing apparatus have not been illustrated.

Some of the description regarding FIG. 3 applies to FIG. 5. The description of the first sensor 301 of FIG. 3 applies to the first sensor 501 of FIG. 5. The description of the second sensor 302 of FIG. 3 applies to the second sensor 502 of FIG. 5. The description of the print head 303 of FIG. 3 applies to the print head 503 of FIG. 5.

FIG. 5 illustrates a printable area of the recording medium 101. The description of the printable area with respect to FIG. 3 applies to the printable area of FIG. 5. In some embodiments, the printable area does not include a margin of the recording medium 101. For example, the area circumscribed by line 505, line 506, line 507 and line 508 comprises the printable area of the recording medium 101. In some embodiments, the printable area includes one or more margins of the recording medium 101. In some embodiments, the printable area comprises the entire surface of the recording medium 101.

FIG. 5 also illustrates a scannable area of the recording medium 101. The scannable area consists of a portion of the recording medium 101 from which pre-print data and post-print data are obtained. For example, the scannable area illustrated in FIG. 5 is circumscribed by line 505, line 509, line 507 and line 510. The size of the scannable area is related to the size of the printable area in some embodiments.

Regarding the relative positioning of components of the printing apparatus, the first sensor 501 is positioned below the print head 503. The second sensor 502 is positioned above the print head 503 on the opposite side of the print head 503 relative to the first sensor 501. The first sensor 501 and the second sensor 502 are substantially aligned in the Y direction. The print head 503 is coupled to the first sensor 501 and to the second sensor 502, such that the three components form an integrated unit.

FIG. 5 illustrates this integrated unit situated at various positions relative to the recording medium 101. Each of positions 51 to 59 and 61 to 69 illustrates a position of the print head 503 in the Y direction, a position of the first sensor 501 in the Y direction, and a position of the second sensor 502 in the Y direction. For example, at position 51, the respective positions of these components in the Y direction may be described as follows: the print head 503 is situated between line 506 and line 509; the first sensor 501 is situated adjacent to and below line 509; and the second sensor 502 is situated adjacent to and above line 506. The description of the positions 31 to 39 with respect to FIG. 3 applies to the positions 51 to 59 and 61 to 69 of FIG. 5.

By way of example, successive movements of the print head 503 will now be discussed. At position 51, the left side of the print head 503 is initially situated at line 505, as shown in FIG. 5. When operation of the printing apparatus advances, the print head 503 moves in the X direction across the width of the recording medium 101 until the right side of the print head 503 is situated at line 507. This movement of the print head 503 comprises a printing pass at position 51. Thus, at the completion of the printing pass at position 51, the right side of the print head 503 is situated at line 507 and the print head 503 is at position 51 in the Y direction.

After the printing pass at position 51, the recording medium 101 advances in the Y direction as indicated by arrow 504. By way of example, movement of the recording medium 101 may be accomplished by rollers in the manner described with respect to FIG. 1. The print head 503, the first sensor 501 and the second sensor 502 remain stationary while the recording medium 101 advances in the Y direction. This movement brings about the relative positioning of the recording medium 101 and the print head 503, the first sensor 501 and the second sensor 502 illustrated by position 52. Regarding the X direction, the right side of the print head 503 is initially situated at line 507 when the print head 503 is brought into position 52.

When operation of the printing apparatus advances, the print head 503 moves in the negative X direction across the width of the recording medium 101 until the left side of the print head 503 is situated at line 505. This comprises a printing pass at position 52. Thus, at the completion of the printing pass at position 52, the left side of the print head 503 is situated at line 505 and the print head 503 is at position 52 in the Y direction.

Thereafter, the printing apparatus performs subsequent printing passes in the manner described so as to execute the print command. For example, a printing pass at position 53 is subsequently performed in the X direction, and then a printing pass at position 54 is performed in the negative X direction, and so on.

During each of these printing passes, the print head 503 dispenses a print band, according to some embodiments. In some embodiments, the first sensor 501 and the second sensor 502 perform a scan during each printing pass.

During the printing pass at position 51, the first sensor 501 performs a pre-print scan of the pre-print scan area at position 51. The pre-print scan area at position 51 is adjacent to and below line 509. As illustrated in FIG. 5, the printing pass at position 51 is performed further in the Y direction than any other printing pass. Consequently, the first sensor 501 does not perform a pre-print scan above the pre-print scan area at position 51. Thus, although the second sensor 502 performs post-print scans above the pre-print scan area at position 51, the portion of the recording medium 101 above the pre-print scan area at position 51 is outside the scannable area because at least one of pre-print data and post-print data is not obtained from that portion of the recording medium 101.

As illustrated in FIG. 5, the pre-print scan area at position 51 and the post-print scan area at position 56 overlap each other. That is, the area scanned by the first sensor 501 during the printing pass at position 51 and the area scanned by the second sensor 502 during the printing pass at position 56 overlap each other. By virtue of these scans, the average print density of the area adjacent to and below line 509 is obtained before printing was to have been performed thereon and, subsequently, the average print density of the area adjacent to and below line 509 is obtained after printing was to have been performed thereon. Thus, the area adjacent to and below line 509 is within the scannable area because both pre-print data and post-print data are obtained therefrom.

Still referring to FIG. 5, the pre-print scan area at position 64 and the post-print scan area at position 69 overlap each other. That is, the area scanned by the first sensor 501 during the printing pass at position 64 and the area scanned by the second sensor 502 during the printing pass at position 69 overlap each other. By virtue of these scans, the average print density of the area adjacent to and above line 510 is obtained before printing was to have been performed thereon and, subsequently, the average print density of the area adjacent to and above line 510 is obtained after printing was to have been performed thereon. Thus, the area adjacent to and above line 510 is within the scannable area because both pre-print data and post-print data are obtained therefrom.

On the other hand, the portion of the recording medium 101 below line 510 is outside the scannable area. As illustrated in FIG. 5, the printing pass at position 69 is performed further in the negative Y direction than any other printing pass. Consequently, the second sensor 502 does not perform a post-print scan below the post-print scan area at position 69. Thus, although the first sensor 501 performs pre-print scans below the post-print scan area at position 69, the portion of the recording medium 101 below the post-print scan area at position 69 is outside the scannable area because at least one of pre-print data and post-print data is not obtained from that portion of the recording medium 101.

In the X direction, the scannable area illustrated in FIG. 5 is bound by the extreme left and right positions of the first sensor 501 and the second sensor 502 as they traverse in the X direction and negative X direction during printing passes.

To summarize, in FIG. 5, the pre-print data obtained from pre-print scans performed during the printing pass at position 51 to the printing pass at position 64 (including all intervening printing passes) correspond to the scannable area. Similarly, the post-print data obtained from post-print scans performed during the printing pass at position 56 to the printing pass at position 69 (including all intervening printing passes) correspond to the scannable area.

As further discussed with reference to FIG. 6, the pre-print data corresponding to the scannable area and the post-print data corresponding to the scannable area are used by the printing apparatus to determine whether printing was successful. The pre-print data obtained during the printing passes from the printing pass at position 51 to the printing pass at position 64 is averaged and compared to the average of the post-print data obtained during the printing passes from the printing pass at position 56 to the printing pass at position 69. If the difference is at least a predetermined level, then it is determined that printing was successful in the scannable area.

According to some embodiments, the first sensor 501 and the second sensor 502 obtain data during each printing pass. Data that corresponds to the scannable area is saved. Data that corresponds to an area outside the scannable area is discarded. According to some embodiments, data is not obtained by the first sensor 501 when the first sensor 501 is outside the scannable area; and data is not obtained by the second sensor 502 when the second sensor 502 is outside the scannable area.

According to some embodiments, the printing apparatus determines when the first sensor 501 and the second sensor 502 are within the scannable area based upon the size of the print head 503 in the Y direction. In FIG. 5, for example, the height of the print head 503 is the distance between line 506 and line 509, as illustrated when the print head 503 is at position 51. The first sensor 501 is within the scannable area during the initial printing pass, i.e., the printing pass at position 51. When the print head 503 is at position 55 such that the side of the print head 503 furthest in the Y direction is at line 509, the controller 201 determines that the second sensor 502 will be within the scannable area during the next printing pass. Thus, the beginning of the scannable area for the first sensor 501 is the initial printing pass and the beginning of the scannable area for the second sensor 502 is the printing pass at position 56.

The height of the print head 503 also determines the end of the scannable area. Regarding the second sensor 502, each printing pass from the printing pass at position 56 through the end of printing on the recording medium 101 is within the scannable area. Regarding the first sensor 501, each printing pass from the initial printing pass through the printing pass at position 64 is within the scannable area. As illustrated when the print head 503 is at position 69, the height of the print head 503 is the distance between line 508 and line 510. When the print head 503 is at position 65 such that the side of the print head 503 furthest in the negative Y direction is at line 510, the controller 201 determines that the first sensor 501 is outside the scannable area.

Figure 6:
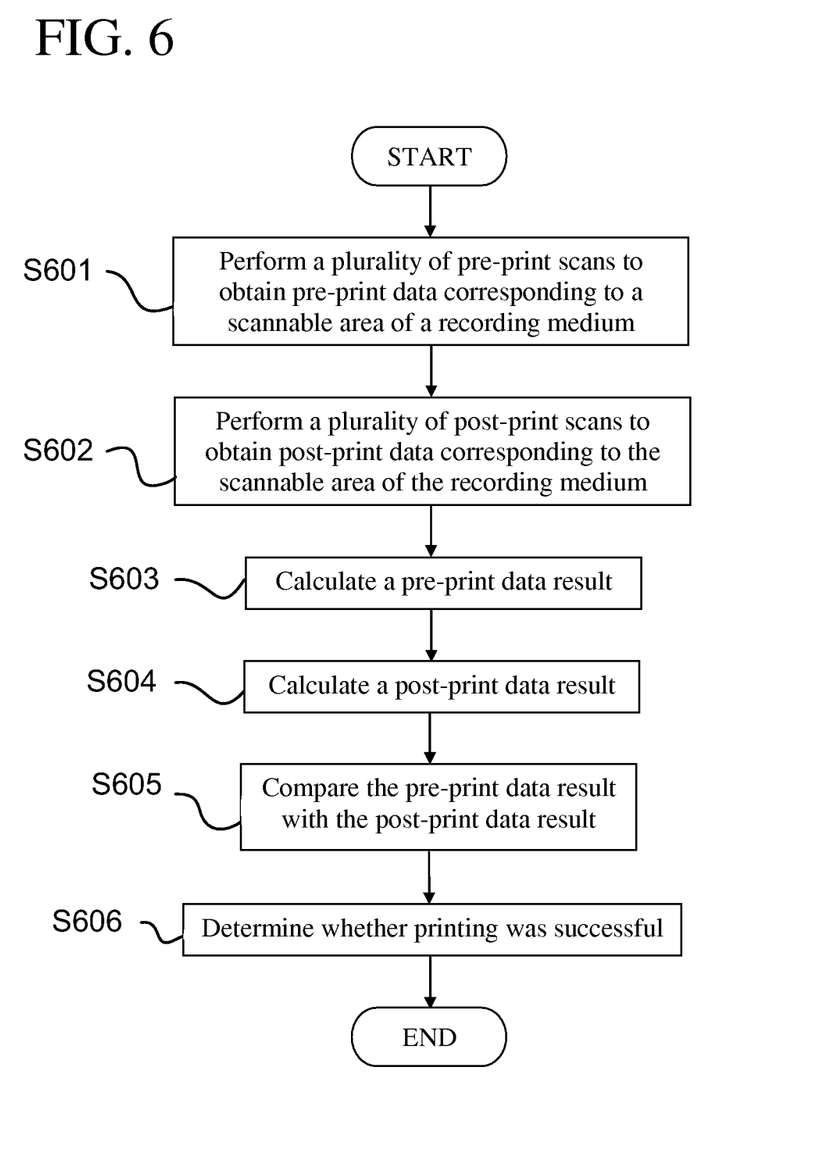
FIG. 6 is a flow diagram that illustrates operations of a printing apparatus according to some embodiments of the present invention.

FIG. 6 is a flow diagram that illustrates operations of a printing apparatus according to some embodiments of the present invention.

At step S601, the printing apparatus performs a plurality of pre-print scans to obtain pre-print data corresponding to a scannable area of a recording medium. For example, the first sensor 501 performs pre-print scans during each of the printing passes from the printing pass at position 51 to the printing pass at position 64 such that the average print density of the respective pre-print scan areas can be determined. In some embodiments, the pre-print data is saved in the memory of the printing apparatus.

At step S602, the printing apparatus performs a plurality of post-print scans to obtain post-print data corresponding to the scannable area of the recording medium. For example, the second sensor 502 performs post-print scans during each of the printing passes from the printing pass at position 56 to the printing pass at position 69 such that the average print density of the respective post-print scan areas can be determined. In some embodiments, the post-print data is saved in the memory of the printing apparatus.

Part of step S601 is performed while step S602 is performed; and part of step S602 is performed while step S601 is performed. Thus, portions of step S601 and S602 occur simultaneously. For example, during the printing pass at position 56, the first sensor 501 performs a pre-print scan while the second sensor 502 simultaneously performs a post-print scan. Prior to the printing pass at position 56, the first sensor 501 will have performed other pre-print scans in the scannable area; whereas, the second sensor 502 will perform an initial post-print scan in the scannable area during the printing pass at position 56.

At step S603, the printing apparatus calculates a pre-print data result. For example, the controller 201 averages the average print densities obtained from the plurality of pre-print scans. According to some embodiments, the pre-print data result comprises the sum of the average print densities obtained from pre-print scans in the scannable area divided by the number of printing passes of the first sensor 501 in the scannable area. With reference to FIG. 5, the pre-print data result comprises the sum of the average print densities obtained from the printing pass at position 51 to the printing pass at position 64 divided by the number of printing passes from the printing pass at position 51 to the printing pass at position 64. According to some embodiments, the pre-print data result comprises the sum of the average print densities obtained from pre-print scans in the scannable area.

At step S604, the printing apparatus calculates a post-print data result. For example, the controller 201 averages the average print densities obtained from the plurality of post-print scans. According to some embodiments, the post-print data result comprises the sum of the average print densities obtained from post-print scans in the scannable area divided by the number of printing passes of the second sensor 502 in the scannable area. With reference to FIG. 5, the post-print data result comprises the sum of the average print densities obtained from the printing pass at position 56 to the printing pass at position 69 divided by the number of printing passes from the printing pass at position 56 to the printing pass at position 69. According to some embodiments, the post-print data result comprises the sum of the average print densities obtained from post-print scans in the scannable area.

At step S605, the printing apparatus compares the pre-print data result with the post-print data result. For example, the controller 201 compares the average of the pre-print data corresponding to the scannable area with the average of the post-print data corresponding to the scannable area. Comparing the pre-print data result with the post-print data result includes determining a difference between the pre-print data result and the post-print data result.

At step S606, the printing apparatus determines whether printing was successful. For example, the controller 201 determines whether printing was successful in the scannable area. By way of example, the controller 201 determines that printing was successful when the difference between the pre-print data result and the post-print data result is at least a predetermined level.

The predetermined level is a tolerance level indicating something has been printed, according to some embodiments of the present invention. That is, the predetermined level is a level of average print density such that if an area that was expected to have been printed upon was determined to have an average print density difference that was equal to or less than that level, then it would be probable that some error, abnormality or interference occurred during execution of the printing. For example, one or more print bands may not have printed.

In the above example, the average print densities obtained during pre-print scans in the scannable area are stored and averaged. The average print densities obtained during post-print scans in the scannable area are also stored and averaged. When the average from the pre-print scans is subtracted from the average from the post-print scans, if the resulting value is above the predetermined level, then printing at the scannable area was likely successful. On the other hand, if the resulting value is equal to or less than the predetermined value, then printing at the scannable area was likely unsuccessful.

Regarding the described embodiments, once a determination is made, the printing apparatus sends a signal to the host 205 indicating that printing was successful or that printing failed, according to some embodiments. In some embodiments, the printing apparatus displays a message that printing was not successful when a determination is made that printing was not successful. In some embodiments, the printing apparatus transmits a message to the source of the print request to display a message at the source of the print request that printing was not successful when a determination is made that printing was not successful.

Embodiments of the present invention can be achieved by the following processing. That is, the processing is to supply a computer-readable storage medium that stores program code of software for realizing the described embodiments to a system or an apparatus and read the program code stored in the computer-readable storage medium by a computer (or CPU, microprocessor unit (MPU)) in the system or apparatus.

In this case, program code in itself read from a computer-readable storage medium realizes the functions of the above described embodiments, and the computer-readable storage medium that stores the program code is included in the scope of embodiments of the present invention.

Examples of a computer-readable storage medium for supplying program code include a floppy disk, a hard disk, a magneto-optical disk (MO), a compact-disk read-only memory (CD-ROM), a compact disk recordable (CD-R), a CD-Rewritable (CD-RW), a digital versatile disk ROM (DVD-ROM), a DVD-RAM, a DVD-RW, a DVD+RW, magnetic tape, a nonvolatile memory card, and a ROM. Program code can also be supplied to the computer-readable storage medium by being downloaded via a network.

The realization of the functions of the described embodiments by a computer executing read program code is also included in the scope of embodiments of the present invention. In addition, the realization of the functions of the described embodiments by actual processing in part or in entirety performed by an operating system (OS) running on a computer in accordance with instructions of the program code is also included in the scope of embodiments of the present invention. In addition, the realization of the functions of the described embodiments by the following processing is also included in embodiments of the present invention. That is, a case where program code read from a computer-readable storage medium is written on a memory included in a function expansion board inserted into a computer or a function expansion unit connected to a computer and then actual processing in part or in entirety is performed in accordance with instructions of the program code by, for example, a CPU incorporated in the function expansion unit is also included in the scope of embodiments of the present invention.

While the present invention has been described with reference to exemplary embodiments, it is to be understood that the invention is not limited to the disclosed exemplary embodiments. The scope of the following claims is to be accorded the broadest interpretation so as to encompass all modifications and equivalent structures and functions.

What is claimed is:

1. A method for printing an image on a recording medium, the method comprising:
    performing printing with a print head mounted on a carriage that reciprocates in a first direction perpendicular to a second direction in which the recording medium moves from upstream to downstream, the printing being performed by a plurality of printing passes each of which is to print one band with the print head while the carriage moves;
    performing a respective pre-print scan of the recording medium during each printing pass of a first set of printing passes, using a first sensor mounted on the carriage at an upstream location of the print head in the second direction, wherein respective pre-print data is obtained from each of the pre-print scans, the respective pre-print data from each of the pre-print scans corresponding to a respective area of the recording medium upon which printing is to be performed;
    performing a respective post-print scan of the recording medium during each printing pass of a second set of printing passes, using a second sensor mounted on the carriage at a downstream location of the print head in the second direction, wherein respective post-print data is obtained from each of the post-print scans, the respective post-print data from each of the post-print scans corresponding to a respective area of the recording medium after printing was to have been performed thereon;
    determining a pre-print data result, the pre-print data result comprising the sum of the respective pre-print data obtained from each of the pre-print scans divided by the number of printing passes in the first set of printing passes;
    determining a post-print data result, the post-print data result comprising the sum of the respective post-print data obtained from each of the post-print scans divided by the number of printing passes in the second set of printing passes; and
    determining whether printing was successful using the pre-print data result and the post-print data result.

2. The method of claim 1, wherein the plurality of printing passes includes the first set of printing passes and the second set of printing passes, the first set of printing passes including at least one printing pass not included in the second set of printing passes, the second set of printing passes including at least one printing pass not included in the first set of printing passes, and
    wherein at least one of the plurality of printing passes is included in both the first set of printing passes and the second set of printing passes.

3. The method of claim 1, wherein each of the respective areas of the recording medium corresponding to the respective pre-print data obtained from each of the pre-print scans is an area of the recording medium from which pre-print data and post-print data are obtained, and
    wherein each of the respective areas of the recording medium corresponding to the respective post-print data obtained from each of the post-print scans is an area of the recording medium from which pre-print data and post-print data are obtained.

4. The method of claim 1, further comprising:
    determining to discard data obtained by the first sensor during one of the plurality of printing passes based on a position of the first sensor over an area of the recording medium from which post-print data will not be obtained.

5. The method of claim 1, further comprising:
    determining not to obtain data using the first sensor during one of the plurality of printing passes based on a position of the first sensor over an area of the recording medium from which post-print data will not be obtained.

6. The method of claim 1, further comprising:
    determining to discard data obtained by the second sensor during one of the plurality of printing passes based on a position of the second sensor over an area of the recording medium from which pre-print data was not obtained.

7. The method of claim 1, further comprising:
    determining not to obtain data using the second sensor during one of the plurality of printing passes based on a position of the second sensor over an area of the recording medium from which pre-print data was not obtained.

8. The method of claim 1, wherein the determining whether the printing was successful comprises:
    determining a difference between the pre-print data result and the post-print data result; and
    determining whether the difference between the pre-print data result and the post-print data result is at least a predetermined level.

9. The method of claim 8, further comprising:
    in response to determining that the difference between the pre-print data result and the post-print data result is not at least the predetermined level, outputting a message that indicates printing was not successful.

10. The method of claim 1, wherein the first sensor is different from the second sensor.

11. An apparatus for printing an image on a recording medium, the apparatus comprising:
    a carriage that reciprocates in a first direction perpendicular to a second direction in which the recording medium moves from upstream to downstream, wherein a print head for printing is mounted on the carriage, the printing being performed by a plurality of printing passes each of which is to print one band with the print head while the carriage moves;
    a first sensor, mounted on the carriage at an upstream location of the print head in the second direction, that is used to perform a respective pre-print scan of the recording medium during each printing pass of a first set of printing passes, wherein respective pre-print data is obtained from each of the pre-print scans, the respective pre-print data from each of the pre-print scans corresponding to a respective area of the recording medium upon which printing is to be performed;
    a second sensor, mounted on the carriage at a downstream location of the print head in the second direction, that is used to perform a respective post-print scan of the recording medium during each printing pass of a second set of printing passes, wherein respective post-print data is obtained from each of the post-print scans, the respective post-print data from each of the post-print scans corresponding to a respective area of the recording medium after printing was to have been performed thereon; and a controller that is configured to:

determine a pre-print data result, the pre-print data result comprising the sum of the respective pre-print data obtained from each of the pre-print scans divided by the number of printing passes in the first set of printing passes;

determine a post-print data result, the post-print data result comprising the sum of the respective post-print data obtained from each of the post-print scans divided by the number of printing passes in the second set of printing passes; and determine whether printing was successful using the pre-print data result and the post-print data result.

12. The apparatus of claim 11, wherein the plurality of printing passes includes the first set of printing passes and the second set of printing passes, the first set of printing passes including at least one printing pass not included in the second set of printing passes, the second set of printing passes including at least one printing pass not included in the first set of printing passes, and wherein at least one of the plurality of printing passes is included in both the first set of printing passes and the second set of printing passes.

13. The apparatus of claim 11, wherein each of the respective areas of the recording medium corresponding to the respective pre-print data obtained from each of the pre-print scans is an area of the recording medium from which pre-print data and post-print data are obtained, and wherein each of the respective areas of the recording medium corresponding to the respective post-print data obtained from each of the post-print scans is an area of the recording medium from which pre-print data and post-print data are obtained.

14. The apparatus of claim 11, wherein the controller is further configured to:

determine to discard data obtained by the first sensor during one of the plurality of printing passes based on a position of the first sensor over an area of the recording medium from which post-print data will not be obtained.

15. The apparatus of claim 11, wherein the controller is further configured to:

determine not to obtain data using the first sensor during one of the plurality of printing passes based on a position of the first sensor over an area of the recording medium from which post-print data will not be obtained.

16. The apparatus of claim 11, wherein the controller is further configured to:

determine to discard data obtained by the second sensor during one of the plurality of printing passes based on a position of the second sensor over an area of the recording medium from which pre-print data was not obtained.

17. The apparatus of claim 11, wherein the controller is further configured to:

determine not to obtain data using the second sensor during one of the plurality of printing passes based on a position of the second sensor over an area of the recording medium from which pre-print data was not obtained.

18. The apparatus of claim 11, wherein, to determine whether the printing was successful, the controller is further configured to:

determine a difference between the pre-print data result and the post-print data result; and determine whether the difference between the pre-print data result and the post-print data result is at least a predetermined level.

19. The apparatus of claim 18, wherein the controller is further configured to:

output a message that indicates printing was not successful in response to a determination that the difference between the pre-print data result and the post-print data result is not at least the predetermined level.

20. The apparatus of claim 11, wherein the first sensor is different from the second sensor.

* * * * *